United States Patent Office 3,106,537
Patented Oct. 8, 1963

3,106,537
CELLULAR REACTION PRODUCT OF ALKYD RESIN, POLYHYDRIC ALCOHOL AND ARYLENE POLYISOCYANATE AND METHOD OF PREPARATION
Eli Simon, Los Angeles, Calif., and Frank W. Thomas, Fulton, Ga., assignors to Lockheed Aircraft Corporation, Burbank, Calif.
No Drawing. Continuation of application Ser. No. 495,824, Mar. 21, 1955. This application Jan. 19, 1959, Ser. No. 787,368
13 Claims. (Cl. 260—2.5)

This invention relates to foamed or cellular plastics and relates more particularly to cellular reaction products of alkyd resins and the polyisocyanates having superior physical properties at elevated temperatures.

This is a continuation of our copending application Serial Number 495,824, filed March 21, 1955, now abandoned.

A characteristic limitation of the cellular plastics obtained by reacting alkyd resins and polyisocyanates, usually with certain additives, is the marked reduction in physical properties of the products at relatively "low" elevated temperatures. This limitation of course materially curtails the field of application or use of such products. We have discovered that the incorporation of selected polyhydric alcohols in the alkyd resins (as latent addition agents thereto) prior to the mixing of the resins and polyisocyanates increases the rigidity of the atomic structure by cutting down on long chains of atoms and substantially increases the heat resistance of the resultant cellular reaction products. For example the ultimate compression strength in pounds per square inch of a material or product of this invention may be as much as twice that of a cellular product tested in the same manner at the same temperature, say 250° F., prepared in the same manner from the same relative proportions of the same ingredients, except for the latent addition agent, and the invention may extend the useable temperature of the products by as much as 100° F. It is therefore an object of this invention to provide cellular alkyd resin-polyisocyanate reaction products having superior heat resistance characteristics.

Another object of this invention is to provide cellular plastic products of this class having substantially uniform cell structure, good uniform poured-in-place adhesion and bond strength and that may be formulated in selected apparent densities as required for given uses while retaining excellent physical strength characteristics throughout such ranges of densities. Additives may be included in the formulations of the reactant resin-isocyanate mixtures to stabilize the foam during the foaming reaction, to render the product fire-retardant or fire-resistant, to reinforce the cellular product and to impart certain other characteristics to the products.

Other objectives and advantages will become apparent from the following description of several typical preferred examples of the invention and the manner of preparing the same.

The reactant foaming mixtures or compositions of the invention for producing the cellular plastics include generally an alkyd resin, a polyhydric alcohol or a blend of such alcohols as a latent addition agent for the resin, a polyisocyanate, and where desired or necessary high molecular weight resin additives for the isocyanate, foam stabilizers, fillers, etc.

The alkyd resins of our composition have an acid number range of from 0.5 to 75 and this acid number range is preferably from 1 to 50. The water content per 100 grams of resin, including the water in the polyols, is from 0.1 to 5 grams by weight and preferably in the range of from 0.1 to 3 grams by weight per 100 grams resin. The ratio of the hydroxyl to the carboxyl groups in the alkyd resin reactants is in the range 4OH:1COOH to 1½ OH:1COOH. The resins we prefer to use are the reaction products of polyhydric alcohols and polybasic acids, substituted or unsubstituted, unmodified or modified with oil, saturated or unsaturated. The proportion range or concentration of the alkyd resins will be discussed below in connection with the isocyanate component. The following are exemplary formulae for the preparation of alkyd resins adapted for incorporation in the reactant foaming compositions of the invention, it being understood that other alkyd resins of this general class are adapted for use in preparing the cellular plastic products.

Resin A:                                                    Mols
    Trimethylol propane_____ 4
    Adipic acid_____ 2½
    Phthalic anhydride_____ ½

Resin B:
    Trimethylol propane_____ 4
    Adipic acid_____ 1
    Dimer acid_____ ½
    Phthalic anhydride_____ ½

Resin C:
    Glycerol _____ 4
    Adipic acid_____ 2½
    Phthalic anhydride_____ ½

Resin D:
    Trimethylol propane_____ 3 9/16
    Oxalic acid_____ 2½
    Dimer acid_____ 7/16

Resin E:
    1,2,6 hexanetriol_____ 4
    Succinic acid_____ 1½
    Adipic acid_____ 1
    Phthalic anhydride_____ ½

Resin F:
    Trimethylol propane_____ 4
    Adipic acid_____ 2½
    Ricinoleic acid_____ 1

Resin G:
    Trimethylol propane_____ 2
    Trimethylol ethane_____ 2
    Maleic anhydride-cyclopentadiene adduct_____ ½
    Adipic acid_____ 2½

Resin H:
    Trimethylol ethane_____ 4
    Adipic acid_____ 1
    Succinic acid_____ ½
    Phathalic anhydride_____ ½
    Dimer acid_____ ½

Resin I:
    Trimethylol propane_____ 4
    Succinic acid_____ 1
    Phthalic anhydride_____ ½
    Dimer acid_____ ½

Resin J:
    Glycerol _____ 4
    Adipic acid_____ 2
    Phthalic anhydride_____ ½
    Ricinoleic acid_____ 1

Resin K:
    Glycerol monoricinoleate_____ 4½
    Trimethylyol propane_____ 12
    Adipic acid_____ 7
    Maleic anhydride_____ 4

Resin L:
    Diethylene glycol_____ 6.3
    Fumaric acid_____ 5
    Sebacic acid_____ 1
    (Acid number 25–60 and preferably approximately 45.)

Resin M:
 Trimethylol propane_____ 4
 Dimer acid_____ ½
 Oxalic acid_____ 2½

The "dimer" acids included in certain of the above examples are dimeric polymers of unsaturated fatty acids such as dimerized linoleic or linolenic acids. They may be prepared by heating the methyl esters of the poly-unsaturated acids (linoleic or linolenic acids) at high temperatures.

The polyhydric alcohols employed as latent addition agents (added to the alkyd resin prior to mixing or preparing the foaming reactant resin-isocyanate compositions) are polyhydric alcohols having a functionality greater than two. In fact, it is preferred that the functionality of the alcohols be three, the preferred alcohols being in the "triol" class. These are represented by glycerine; glycerol polyols, such as glycerol dimers and trimers prepared by dehydration of glycerol; 1,2,6 hexanetriol; 1,2,4 butanetriol; trimethylol propane; trimethylol ethane; and mixtures of such triols. In our procedure for preparing the glycerol polyols, CP glycerine containing 0.3% sodium hydroxide was heated to about 230° C., held for about 15 minutes, then slowly heated to 260–265° C., and held until the calculated amount of water was removed. It is also contemplated that polyhydric alcohols having a functionality greater than three, for example where the functionality is four may be employed, it being preferred however that where such polyhydric alcohols are employed they are mixed with the fluid triols. Examples of the polyhydric alcohols having a functionality of four and suitable for use in this manner are pentaerythritol and erythritol (or 1,2,3,4 butanetetrol). It is preferred and desirable that the polyhydric alcohol addition agents be fluid in order to facilitate their blending or incorporation with the alkyd resin component. We have obtained excellent results by employing glycerol, polyglycerol, 1,2,4 butanetriol and 1,2,6 hexanetriol individually and in blends as the latent addition agent incorporated in or added to the alkyd resin components. The polyhydric alcohol addition agent is employed in a concentration range of from one part by weight of the polyhydric alcohol to 100 parts by weight of the alkyd resin to 50 by weight of the polyhydric alcohol to 100 parts by weight of the resin. A preferred concentration of the polyhydric alcohol addition agent is from 3 to 35 parts by weight of the polyhydric alcohol to 100 parts by weight of the alkyd resin component.

The polyisocyanates employed in the reactant foaming compositions of the invention are di and tri isocyanates and isothiocyanates used either singly or in mixtures. The following are illustrative: 2,4 tolylene diisocyanate; 2,6 tolylene diisocyanate; hexamethylene diisocyanate; 1-chlorophenyl 2,4 diisocyanate; methylene bis (p,p′ phenyl isocyanate); dianisidine diisocyanate, or [bis (o-methoxy phenyl isocyanate)]; bitolylene diisocyanate, or 3,3′-dimethyl 4,4′-biphenylene diisocyanate; 2,4 tolylene diisothiocyanate; trimethylene diisothiocyanate; napthalene 1,4 diisocyanate; triphenylmethane triisocyanate; diphenylmethane diisothiocyanate; 1,3,5 triisocyanato benzene; 2,4,6 triisocyanato toluene. Normally solid (powdered) polyisocyanates such as: dianisidine diisocyanate; bitolylene diisocyanate; naphthalene 1,4 diisocyanate and triphenylmethane diisocyanate, to the end that the same may be readily mixed with the alkyd resin component, may be used with the individual or mixed normally liquid polyisocyanates such as 2,4 tolylene diisocyanate and 2,6 tolylene diisocyanate up to 75% by weight of the total weight of polyisocyanates and polyisothiocyanates used. The polyisocyanate component, such as meta-toluene diisocyanate, or 2,4 tolylene diisocyanate, may be incorporated in the foaming reactant composition in the proportion of from 75 to 400 parts by weight per 100 parts by weight of the alkyd resin component and preferably from 75 to 300 parts by weight of the polyisocyanate to 100 parts by weight of the alkyd resin component. When it is desired to obtain or produce a cellular plastic having optimum heat resistance the optimum proportion of the polyisocyanate to be employed may be determined by analyzing or considering the alkyd resin component in terms of its water content, acid number and hydroxyl content and by carefully analyzing or considering the water content and hydroxyl number of the polyhydric alcohol latent addition agent to be employed.

One or more thermoplastic polymeric resin additives may be used with the polyisocyanate component to stabilize the foam during the reaction, permit the use of increased water contents when desired, increase the elasticity of the cell walls during the foaming action and for performing other functions productive of superior physical properties in the low density cellular plastic products. These additives are soluble in the polyisocyanate component and may or may not react with the same. The high molecular weight thermoplastic film forming polymeric resin additives which we employ include: ethyl cellulose, polymeric chlorinated natural rubber, benzyl cellulose, natural rubber, polymeric vinyl chloridevinyl acetate copolymers, polyvinyl acetate, polystyrene, polydichlorostyrene, polymeric acrylate and methacrylate resins and their copolymers and polyvinyl butyral. Ethyl cellulose has been found to be particularly effective as the thermoplastic resin additive and satisfactory results have been obtained using commercial grades of ethyl cellulose resins wherein the substitution values are between 2.15 and 2.60 ethoxyl groups for each glucose unit, that is, where the ethoxyl content is between 43% and 50%. The preferred ethoxyl content range of the ethyl cellulose resin is from 45 to 49.5% by weight. The ethyl cellulose resins employed in the formulations are soluble in the isocyanate component. The viscosity of the ethyl cellulose resins which we employ is between 7 and 200 centipoises and preferably between 50 and 100 centipoises, the viscosity being determined on the basis of a 5% by weight concentration of the ethyl cellulose in a solution of from 70 to 80 parts by weight of toluene with from 30 to 20 parts by weight of ethanol at 20° C. Relatively low concentrations of the ethyl cellulose are found to be effective in the foaming reactant compositions although this high molecular weight resinous additive may be used in substantial proportions when desired. The concentration of the ethyl cellulose as used in solution in the 2,4 toluene diisocyanate or other polyisocyanates or mixtures of the same may range from 0.03 gram to 15 grams for each 100 grams of the polyisocyanate a preferred concentration of the ethyl cellulose being from ½ to 6 grams for each 100 grams of the polyisocyanate.

In preparing the foamed or cellular plastic materials, particularly where superior physical strength characteristics are to be desired, one or more quaternary ammonium bentonite complexes may be incorporated in the alkyd resin polyisocyanate foaming system. The bentonite salts of quaternary ammonium compounds we have found to be useful and effective as foamed stabilizers and as agents for increasing the physical strength properties of the resultant cellular plastics include:

(1) Dimethyl didodecyl ammonium bentonite;
(2) Dimethyl dodecyl hexadecyl ammonium bentonite;
(3) Dimethyl dihexadecyl ammonium bentonite;
(4) Dimethyl hexadecyl octadecyl ammonium bentonite; and
(5) Dimethyl dioctadecyl ammonium bentonite.

These "Bentones" or quaternary ammonium bentonite compounds or complexes are employed individually or in suitable mixtures or blends in the reactant polyisocyanate alkyd resin reactant mixtures in the proportion of from 1½ to 15 parts by weight for each 100 parts by weight of the alkyd resin component.

The reactant foaming alkyd resin-polyisocyanate compositions for obtaining the high strength, high temperature resistant cellular plastics may include one or more fillers, reinforcing materials and the like. Such fillers include airfloat silica; metal leafing powders such as aluminum leafing powder, copper leafing powder, silver leafing powder, etc; mica dust; titanium dioxide; and silica aerogel. These materials may be employed individually or in mixtures in total filler concentrations of from 1 part by weight to 100 parts by weight of the alkyd resin component to 50 parts by weight for each 100 parts by weight of the resin component.

The following are typical preferred examples of formulations for the foaming reactant compositions for producing the heat resistant cellular plastic products. In these examples the ingredients or components are set forth in terms of parts by weight, the water content and ethoxyl content are in percentages by weight and the weights of the polyols are on an anhydrous basis.

EXAMPLE 1

| | Parts |
|---|---|
| Resin B—acid number from 10 to 30 and water content approximately 0.6% | 25 |
| Glycerol | 5 |
| Meta-toluene diisocyanate (or 2,4 tolylene diisocyanate) containing 2 parts ethyl cellulose or from 7 to 200 centipoises and an ethoxyl content of from 43 to 49.5%, per 100 parts of the meta-toluene diisocyanate | 40 |

In Example 1 the water content of the resin may vary from 0.3 to 1.5%; the meta-toluene diisocyanate-ethyl cellulose mixture may vary from 35 to 50 grams and the acid number of resin may vary from 0.5 to 35.

EXAMPLE 2

| | Parts |
|---|---|
| Resin A—acid number 5 to 25—water content 1% | 25 |
| Glycerol | 5 |
| Meta-toluene diisocyanate containing 6 parts ethyl cellulose of from 7 to 200 centipoises having an ethoxyl content of from 43 to 49.5%, per 100 parts of the meta-toluene diisocyanate | 40 |

In Example 2 the acid number of the resin may vary from 5 to 40; the water content of the resin may vary from 0.1 to 1.5%; the meta-toluene diisocyanate mixture may vary from 30 to 55 parts; the glycerol may vary from 1 to 10 parts and may be replaced by equivalent weights of glycerol dimers or trimers, 1,2,4 butanetriol and 1,2,6 hexanetriol.

EXAMPLE 3

| | Parts |
|---|---|
| Resin F—acid number 1 to 30—the water content approximately .75% | 25 |
| 1,2,6 hexanetriol | 7 |
| Meta-toluene diisocyanate containing 2 parts by weight ethyl cellulose of from 50 to 200 centipoises having an ethoxyl content from 45 to 49.5%, per 100 parts of the meta-toluene diisocyanate | 45 |

EXAMPLE 4

| | Parts |
|---|---|
| Resin D—acid number 5 to 30—water content approximately 0.85% | 25 |
| Glycerol | 1–5 |
| 1,2,6 hexanetriol | 0.01–3 |
| Meta-toluene diisocyanate | 30–55 |

In this example resin M may be substituted for resin D and meta-toluene diisocyanate containing 2 grams ethyl cellulose of from 50 to 200 centipoises and having an ethoxyl content of from 45 to 49.5% per 100 grams meta-toluene diisocyanate may be substituted for the meta-toluene diisocyanate component.

EXAMPLE 5

| | Parts |
|---|---|
| Resin C—acid number 5 to 30—water content 1.5% | 25 |
| Glycerol | 5 |
| Aluminum leafing powder (422 mesh) | 2 |
| Zinc stearate | ½ |
| Meta-toluene diisocyanate | 45 |

EXAMPLE 6

| | Parts |
|---|---|
| Resin K—acid number 5 to 30—water content 1% | 25 |
| Trimethylol propane | 2 |
| Glycerol | 5 |
| Meta-toluene diisocyanate containing 2 parts ethyl cellulose of from 50 to 200 centipoises viscosity having an ethoxyl content from 45 to 49.5%, per 100 parts of the meta-toluene diisocyanate | 50 |

EXAMPLE 7

| | Parts |
|---|---|
| Resin B—acid number 1 to 30—water content 0.75% | 25 |
| Glycerol | 1–5 |
| Meta-toluene diisocyanate | 30–45 |

In Example 7 the water content is from 0.1 to 3.5% and preferably from 0.3 to 2%; the glycerol may be substituted by equivalent weights of other normally liquid polyols having a functionality greater than 2, such as glycerol dimers and trimers; fillers may be added, such as powdered silica, mica dust, titanium dioxide and silica aerogels preferably up to 10 parts by weight, based on the given formulation.

EXAMPLE 8

| | Parts |
|---|---|
| Resin A—acid number 5 to 30, water content 1% | 25 |
| Glycerol | 5 |
| Methylene bis diisocyanate | 10 |
| Meta-toluene diisocyanate having 6 parts ethyl cellulose of from 50 to 200 centipoises viscosity and an ethoxyl content of from 45 to 49.5%, per 100 parts | 45 |

EXAMPLE 9

| | Parts |
|---|---|
| Resin B (acid number 20, 0.7% $H_2O$) | 10 |
| Resin A (acid number 20, 0.7% $H_2O$) | 15 |
| Glycerol | 5 |
| Meta-toluene diisocyanate containing 6 parts of ethyl cellulose, ethoxy content 45 to 49.5%, viscosity 50 to 200 centipoises, per 100 grams meta-toluene diisocyanate | 40 |

In Example 9 the acid number of the resins may be from 1 to 40 and preferably 5 to 20; the water content of the resins is from 0.1 to 3.5% and preferably from 0.3 to 2%; the glycerol, or other normally liquid polyols having a functionality greater than 2 may be used in amounts from 1 to 10 parts; the meta-toluene diisocyanate-ethylcellulose solution may be used in amounts from 30 to 60 parts. Airfloat silica, or other fillers such as mica dust, titanium dioxide and metal leafing powders may be used in the amount of from 0.5 to 15 parts.

EXAMPLE 10

| | Parts |
|---|---|
| Resin B (acid number 20, 0.7% $H_2O$) | 10 |
| Resin A (acid number 20, 0.7% $H_2O$) | 15 |
| Glycerol | 5 |
| Dianisidine diisocyanate (powder dianisidine diisocyanate) | 17 |
| Meta-toluene diisocyanate containing 6 parts of ethyl cellulose, ethoxy content 45 to 49.5%, viscosity 50 to 200 centipoises, per 100 grams meta-toluene diisocyanate | 30 |

In Example 10 the acid number of the resins may vary from 1 to 40 and preferably from 5 to 30; the water content of the individual resins is from 0.1 to 2.5%; the dianisidine diisocyanate powder may vary from 5 to 25 parts and may be substituted in part or entirely by equivalent weights of other normally solid polyisocyanates such as bitolylene diisocyanate, napthalene 1,4 diisocyanate, and 2,4,6 triisocyanato toluene, either singly or admixed; the meta-toluene diisocyanate-ethyl cellulose solution may vary from 20 to 40 parts and may be replaced entirely or in part by 2,6 toluene diisocyanate, and the glycerol may vary from 1 to 10 parts and may be substituted by equivalent weights of other normally liquid polyols having a functionality greater than 2, such as glycerol dimers and trimers, 1,2,6 hexanetriol, and 1,2,4 butanetriol.

EXAMPLE 11

| | Parts |
|---|---|
| Resin L (acid number approximately 45) | 20 |
| Resin A (acid number, 10 to 25, 1% $H_2O$) | 40 |
| Styrene monomer | 6 |
| Benzoyl peroxide paste (50% benzoyl peroxide) | ½ |
| Meta-toluene diisocyanate containing 6 parts of ethyl cellulose, ethoxy content 45 to 49.5%, viscosity 50 to 200 centipoises, per 100 grams meta-toluene diisocyanate | 50 |
| Glycerol | 5 |

EXAMPLE 12

| | |
|---|---|
| Resin A (acid number approximately 20, approximately 0.7% $H_2O$) | 15 |
| Resin B (acid number approximately 20, approximately 0.7% $H_2O$) | 10 |
| Glycerol | 5 |
| Meta-toluene diisocyanate containing 6 parts of ethyl cellulose, ethoxy content 45 to 49.5%, viscosity 50 to 200 centipoises, per 100 grams meta-toluene diisocyanate | 40 |
| Dimethyl hexadecyl octadecyl ammonium bentonite | 2 |

EXAMPLE 13

| | |
|---|---|
| Resin C (acid number 14, 1% $H_2O$) | 28 |
| Glycerol | 2 |
| Meta-toluene diisocyanate | 35 |

EXAMPLE 14

| | |
|---|---|
| Resin C (acid number 20, 0.75% $H_2O$) | 25 |
| Glycerol | 5 |
| Aluminum leafing powder (422) | 2½ |
| Zinc stearate | ¼ |
| 2,4 tolylene diisocyanate | 20 |
| 2,6 tolylene diisocyanate | 35 |

EXAMPLE 15

| | |
|---|---|
| Resin C (acid number 5, 1.5% $H_2O$) | 25 |
| Glycerol | 3 |
| 1,2,4 butanetriol | 2 |
| Powdered silica | 5 |
| Zinc stearate | 2 |
| Meta-toluene diisocyanate | 35 |
| Hexamethylene diisocyanate | 5 |

EXAMPLE 16

| | |
|---|---|
| Resin C (acid number 1, 1% $H_2O$) | 25 |
| Glycerol dimer | 5 |
| Meta-toluene diisocyanate | 30 |
| Methylene bis diisocyanate | 15 |

In making or producing the cellular plastic products of the invention the several ingredients (individual ingredients and blends) are thoroughly mixed together in the proportions designed to produce a foamed plastic having the required density physical strength characteristics and high temperature resistance. The polyhydric alcohol component is added to the alkyd resin as a latent addition agent and the blend of the resin and polyhydric alcohol is mixed with the polyisocyanate component and other ingredients. When the several ingredients have been properly mixed the resultant reactant composition is poured into the mold or into a cavity in a structure wherein the cellular plastic mass is to form a part or is applied by blading or by other means and then allowed to react at atmospheric pressure and room temperature. A simultaneous or balanced rate reaction occurs between the polyisocyanate, the alkyd resin and the polyhydric alcohol to produce the improved cellular reaction product. The simplicity of the process makes it highly suitable for production use.

In order to best develop the heat resisting properties of the cellular product it is preferably post-cured at temperatures up to 400° F. and preferably at temperatures between 200 and 350° F. for a period of from 2 to 10 hours. The cellular plastic firmly adheres to the surfaces of practically all solid materials during the foaming reaction and retains this adherence when set and cured. The formulations of the invention when properly reacted and cured produce foamed or cellular plastics resistant to heat and which remain hard and resistant to distortion under temperatures as high as 400° F. The results of actual tests conducted to compare exemplary alkyd resin-polyisocyanate foamed reaction products with and without the above described latent addition agents (polyhydric alcohols) illustrate the unexpected manner in which these agents greatly extend or increase the heat resistance of the products. In these comparisons test specimens 2½ inches by 2 inches by 1 inch, with the foam rise in the 2½ inch direction were produced from the following formulations, post-cured at 300° F., and tested in compression at 250° F. by loading the specimens on the 2 inch by 1 inch faces, that is, parallel to the direction of the foam rise.

Test Formulation (a)

| | Grams |
|---|---|
| Resin A—acid number 20—water content 0.5% | 25 |
| Glycerol | 5 |
| Meta-toluene diisocyanate containing 6 parts by weight ethyl cellulose of 100 centipoise viscosity and 48–49.5% ethoxyl content per 100 parts by weight of meta-toluene diisocyanate | 40 |

Test Formulation (b)

| | |
|---|---|
| Resin B—acid number 20—water content 0.5% | 25 |
| Glycerol | 5 |
| Meta-toluene diisocyanate containing 6 parts by weight ethyl cellulose of 100 centipoise viscosity and 48–49.5% ethoxyl content, per 100 parts by weight of the meta-toluene diisocyanate | 40 |

Test Formulation (c)

| | |
|---|---|
| Resin A—acid number 20—water content 0.5% | 30 |
| Meta-toluene diisocyanate containing 6 parts by weight ethyl cellulose of 100 centipoise viscosity having from 48–49.5% ethoxyl content per 100 parts by weight of meta-toluene diisocyanate | 30 |

Test Formulation (d)

| | |
|---|---|
| Resin B—acid number 20—water content 0.5% | 30 |
| Meta-toluene diisocyanate containing 6 parts by weight ethyl cellulose, 100 centipoise viscosity having from 48–49.5% ethoxyl content, per 100 parts by weight of the meta-toluene diisocyanate | 30 |

While the amounts of the diisocyanate solution components in Test Formulations (a) and (b) are greater than in Test Formulations (c) and (d), the weights of the diisocyanate required for the resin components are the same in all of these formulations. The additional amount of diisocyanate in Test Formulations (a) and (b) is required to compensate for the glycerol latent addition agent; i.e., to react with the glycerol.

The results of the compression tests conducted as above described at 250° F. on the specimens prepared from Formulations (a), (b), (c) and (d) were as follows:

| Number | Ultimate Compressive Strength (p.s.i.) | Specimen Density in Pounds Per cu. in. |
| --- | --- | --- |
| (a) | 415 | 16.5 |
| (b) | 455 | 20 |
| (c) | 240 | 17 |
| (d) | 275 | 20 |

In considering these tests the results with specimen (a) should be compared with comparable specimen (c) and specimen (b) should be compared with comparable specimen (d). It will at once become apparent that the specimens prepared in accordance with the formulations of the present invention had ultimate compressive strengths (in pounds per square inch) almost two times those of test specimens (c) and (d), the apparent density of the respective comparable specimens being substantially the same. These and similar tests establish the superior high temperature resistance of the cellular plastic products prepared in accordance with this invention.

It should be understood that the invention is not necessarily based upon or dependent upon the theories which we have expressed. Nor is the invention to be regarded as limited to the express procedure or materials set forth, these details being given only by way of illustration and to aid in clarifying the invention. We do not regard such specific details as essential to the invention except insofar as they are expressed by way of limitation in the following claims.

We claim:

1. A method of making a cellular resin product comprising simultaneously reacting on an approximate part by weight basis, an alkyd resin having an acid number of from 0.5 to 75, from 1 to 50 parts for each 100 parts of resin of a polyhydric alcohol having a hydroxyl functionality greater than two selected from the group consisting of glycerol, glycerol dimers, glycerol trimers, trimethylol propane, trimethylol ethane, 1,2,6 hexanetriol, 1,2,4 butanetriol, pentaerythritol and erythritol, and arylene polyisocyanate in the amount of from 75 to 400 parts to each 100 parts of the resin, the resin and said alcohol having a total water content of from 0.1 to 5 parts per 100 parts of the resin.

2. The method of claim 1 including adding to the arylene polyisocyanate prior to reacting the arylene polyisocyanate with the alkyd resin and polyhydric alcohol, a high molecular weight thermoplastic polymeric resin additive in the amount of from 0.03 to 15 parts per 100 parts of the arylene polyisocyanate, said polymeric resin additive being selected from the group consisting of:

ethyl cellulose
    chlorinated natural rubber
    benzyl cellulose
    natural rubber
    vinylchloride-vinyl acetate copolymers
    polyvinyl chloride
    polyvinyl acetate
    polystyrene
    polydichlorostyrene, and
    polyvinyl butyral.

3. A method of making a cellular resin product comprising simultaneously reacting on an approximate part by weight basis, an alkyd resin having an acid number of from 0.5 to 75 and wherein the ratio range of the hydroxyl groups to the carboxyl groups in the alkyd resin is from 4(OH):1(COOH) to 1½(OH):1(COOH), from 1 to 50 parts for each 100 parts of resin of a polyhydric alcohol having a hydroxyl functionality greater than two selected from the group consisting of glycerol, glycerol dimers, glycerol trimers, trimethylol propane, trimethylol ethane, 1,2,6 hexanetriol, 1,2,4 butanetriol, pentaerythritol and erythritol, and arylene polyisocyanate in the amount of from 75 to 400 parts to each 100 parts of the resin, the resin and said alcohol having a total water content of from 0.1 to 5 parts per 100 parts of the resin.

4. The method of claim 3 including adding to the arylene polyisocyanate prior to reacting the arylene polyisocyanate with the alkyd resin and polyhydric alcohol, a high molecular weight thermoplastic polymeric resin additive in the amount of from 0.03 to 15 parts per 100 parts of the arylene polyisocyanate, said polymeric resin additive being selected from the group consisting of:

ethyl cellulose
    chlorinated natural rubber
    benzyl cellulose
    natural rubber
    vinylchloride-vinyl acetate copolymers
    polyvinyl chloride
    polyvinyl acetate
    polystyrene
    polydichlorostyrene, and
    polyvinyl butyral.

5. The method of claim 3 including adding to the arylene polyisocyanate prior to reacting the arylene polyisocyanate with the alkyd resin and polyhydric alcohol, of from 0.03 to 15 parts ethyl cellulose for each 100 parts of the arylene polyisocyanate, the ethyl cellulose having a viscosity of from 7 to 200 centipoises and an ethoxyl content of from 43 to 49.5%.

6. The method of claim 3 including adding to the alkyd resin prior to reacting the arylene polyisocyanate with the alkyd resin and polyhydric alcohol, from 1.5 to 15 parts per 100 parts of the resin of a bentonite salt of a quaternary ammonium compound selected from the group consisting of:

dimethyl didodecyl ammonium bentonite
    dimethyl dodecyl hexadecyl ammonium bentonite
    dimethyl dihexadecyl ammonium bentonite
    dimethyl hexadecyl octadecyl ammonium bentonite
    dimethyl dioctadecyl ammonium bentonite.

7. A method of making a cellular resin product comprising simultaneously reacting on an approximate part by weight basis, 25 parts of an alkyd resin having an acid number of from 10 to 30 and a water content of from 0.3 to 1.5% prepared from 4 mols of trimethylol propane, 1 mol adipic acid, ½ mol phthalic anhydride, and ½ mol of a dimer acid selected from the group consisting of linoleic acid and linolenic acids, 5 parts glycerol, and 40 parts of a liquid arylene polyisocyanate containing in solution 2% by weight ethyl cellulose having a viscosity of from 7 to 200 centipoises and an ethoxyl content of from 43 to 49.5%.

8. A method of making a cellular resin product comprising simultaneously reacting on an approximate part by weight basis, 25 parts of an alkyd resin having an acid number of from 5 to 30 and a water content of about 0.85% prepared from 3⁹⁄₁₆ mols trimethylpropane, 2½ mols oxalic acid and ¹⁄₁₆ mol of a dimer acid selected from the group consisting of linoleic acid and linolenic acid, from 1 to 5 parts glycerol, from 0.01 to 3 parts 1,2,6 hexanetriol, and from 30 to 55 parts arylene polyisocyanate.

9. A method of making a cellular resin product comprising simultaneously reacting on an approximate part by weight basis, 10 parts of an alkyd resin having an acid number of about 20 and a water content of about 0.7% prepared from 4 mols trimethylolpropane, 1 mol adipic acid, ½ mol phthalic anhydride and ½ mol of a dimer acid selected from the group consisting of linoleic acid and linolenic acid, 15 parts of an alkyd resin having an acid number of about 20 and a water content of about 0.7% prepared from 4 mols trimethylolpropane, 2½ mols adipic acid and ½ mol phthalic anhydride, 5 parts glycerol and 40 parts of an arylene polyisocyanate containing about 6% by weight ethyl cellulose having a viscosity of from 50 to 200 centipoises and an ethoxyl content of from 43 to 49.5%.

10. The cellular resin product made by the process of simultaneously reacting on an approximate part by weight basis, an alkyd resin having an acid number of from 0.5 to 75, from 1 to 50 parts for each 100 parts of resin of a polyhydric alcohol having a hydroxyl functionality greater than two selected from the group consisting of glycerol, glycerol dimers, glycerol trimers, trimethylol propane, trimethylol ethane, 1,2,6 hexanetriol, 1,2,4 butanetriol, pentaerythritol and erythritol, and arylene polyisocyanate in the amount of from 75 to 400 parts to each 100 parts of the resin, the resin and said alcohol having a total water content of from 0.1 to 5 parts per 100 parts of the resin.

11. The cellular resin product made by the process of claim 10 including adding to the arylene polyisocyanate prior to reacting the arylene polyisocyanate with the alkyd resin and polyhydric alcohol, a high molecular weight thermoplastic polymeric resin additive in the amount of from 0.03 to 15 parts per 100 parts of the arylene polyisocyanate, said polymeric resin additive being selected from the group consisting of ethyl cellulose, chlorinated natural rubber, benzyl cellulose, natural rubber, vinylchloride-vinyl acetate copolymers, polyvinyl chloride, polyvinyl acetate, polystyrene, polydichlorostyrene and polyvinyl butyral.

12. The cellular resin product made by the process of claim 10 including the addition of from 1.5 to 15 parts per 100 parts of the resin of a bentonite salt of a quaternary ammonium compound selected from the group consisting of dimethyl didodecyl ammonium bentonite, dimethyl dodecyl hexadecyl ammonium bentonite, dimethyl dihexadecyl ammonium bentonite, dimethyl hexadecyl octadecyl ammonium bentonite, dimethyl dioctadecyl ammonium bentonite.

13. The method of making a cellular resin product comprising simultaneously reacting on an approximate part by weight basis, an alkyd resin having an acid number of from 1 to 30 and a water content of about 0.75% which is the reaction product of a polyhydric alcohol and a polybasic acid wherein the ratio of the hydroxyl to the carboxyl groups is in the range of 4OH:1COOH to 1½OH:1COOH, from 1 to 50 parts for each 100 parts of resin of a polyhydric alcohol selected from the group consisting of glycerol, glycerol dimers, glycerol trimers, trimethylol propane, trimethylol ethane, 1,2,6 hexanetriol, 1,2,4 butanetriol, pentaerythritol and erythritol, and from 75 to 400 parts for each 100 parts of resin of an arylene polyisocyanate selected from the group consisting of toluene diisocyanate, 2,4 tolylene diisocyanate, 2,6 tolylene diisocyanate, hexamethylene diisocyanate, 1-chlorophenyl 1,2,4 diisocyanate, methylene bis (p,p' phenyl isocyanate), dianisidine diisocyanate, bitolylene diisocyanate, 2,4 tolylene diisothiocyanate, trimethylene diisothiocyanate, naphthalene 1,4 diisocyanate, triphenylmethane triisocyanate, diphenylmethane diisothiocyanate, 1,3,5 triisocyanato benzene, 2,4,6 triisocyanato toluene.

References Cited in the file of this patent

UNITED STATES PATENTS

| | | |
|---|---|---|
| 2,602,783 | Simon et al. | July 8, 1952 |
| 2,621,166 | Schmidt et al. | Dec. 9, 1952 |
| 2,634,244 | Simon et al. | Apr. 7, 1953 |
| 2,764,566 | Simon et al. | Sept. 25, 1956 |
| 2,780,350 | Simon et al. | Feb. 5, 1957 |
| 2,846,408 | Brochhagen et al. | Aug. 5, 1958 |
| 2,894,919 | Simon et al. | July 14, 1959 |
| 2,959,242 | Muller et al. | Nov. 8, 1960 |

FOREIGN PATENTS

| | | |
|---|---|---|
| 1,047,420 | Germany | Dec. 24, 1958 |